US012100913B2

(12) United States Patent
Wu et al.

(10) Patent No.: US 12,100,913 B2
(45) Date of Patent: Sep. 24, 2024

(54) ADAPTER CONNECTOR WITH IMPROVED SHIELDING EFFECT

(71) Applicant: Dongguan Luxshare Technologies Co., Ltd, Dongguan (CN)

(72) Inventors: Shengyu Wu, Dongguan (CN); Chuanqi Gong, Dongguan (CN); Hongji Chen, Dongguan (CN)

(73) Assignee: Dongguan Luxshare Technologies Co., Ltd, Dongguan (CN)

(*) Notice: Subject to any disclaimer, the term of this patent is extended or adjusted under 35 U.S.C. 154(b) by 0 days.

(21) Appl. No.: 18/207,278

(22) Filed: Jun. 8, 2023

(65) Prior Publication Data

US 2023/0318232 A1 Oct. 5, 2023

Related U.S. Application Data

(63) Continuation of application No. 17/201,671, filed on Mar. 15, 2021, now Pat. No. 11,715,913.

(30) Foreign Application Priority Data

Mar. 18, 2020 (CN) ......................... 202010194118.8

(51) Int. Cl.

*H01R 13/6586* (2011.01)
*H01R 12/71* (2011.01)
(Continued)

(52) U.S. Cl.

CPC ....... *H01R 13/6586* (2013.01); *H01R 12/716* (2013.01); *H01R 12/73* (2013.01);
(Continued)

(58) Field of Classification Search

CPC .. H01R 13/6586; H01R 12/716; H01R 12/73; H01R 13/40; H01R 13/42; H01R 13/502;
(Continued)

(56) References Cited

U.S. PATENT DOCUMENTS 6,421,912 B1 7/2002 Tomioka et al.
9,711,907 B2 7/2017 Tamai
(Continued)

FOREIGN PATENT DOCUMENTS

CN 104009338 A 8/2014
CN 205609917 U 9/2016
(Continued)

*Primary Examiner* — Justin M Kratt

(74) *Attorney, Agent, or Firm* — Birch, Stewart, Kolasch & Birch, LLP

(57) ABSTRACT

An adapter connector includes a terminal assembly, a first adapter housing and a second adapter housing. The terminal assembly includes a first terminal clamping portion at a first end and a second terminal clamping portion at a second end. The terminal assembly includes a first terminal module including a first insulating block, a number of first adapter terminals, a first metal shield provided on a first side of the first insulating block, a second metal shield provided on a second side of the first insulating block, and a first conductive plate. The first adapter terminals include a number of first ground terminals. The first metal shield is in contact with one side of the first grounding terminals, and the first conductive plate is in contact with another side of the first ground terminal.

19 Claims, 14 Drawing Sheets

(51) Int. Cl.

| | |
|---|---|
| ***H01R 12/73*** | (2011.01) |
| ***H01R 13/40*** | (2006.01) |
| ***H01R 13/42*** | (2006.01) |
| ***H01R 13/502*** | (2006.01) |
| ***H01R 13/514*** | (2006.01) |
| ***H01R 13/6591*** | (2011.01) |
| ***H01R 13/6597*** | (2011.01) |
| ***H01R 31/06*** | (2006.01) |
| *H01R 12/70* | (2011.01) |
| *H01R 13/405* | (2006.01) |
| *H01R 13/426* | (2006.01) |
| *H01R 13/648* | (2006.01) |
| *H01R 13/658* | (2011.01) |
| *H01R 13/6581* | (2011.01) |
| *H01R 13/6585* | (2011.01) |
| *H01R 31/00* | (2006.01) |

(52) U.S. Cl.

CPC ............. *H01R 13/40* (2013.01); *H01R 13/42* (2013.01); *H01R 13/502* (2013.01); *H01R 13/514* (2013.01); *H01R 13/6591* (2013.01); *H01R 13/6597* (2013.01); *H01R 31/06* (2013.01); *H01R 12/7082* (2013.01); *H01R 12/71* (2013.01); *H01R 12/712* (2013.01); *H01R 13/405* (2013.01); *H01R 13/426* (2013.01); *H01R 13/648* (2013.01); *H01R 13/658* (2013.01); *H01R 13/6581* (2013.01); *H01R 13/6585* (2013.01); *H01R 31/005* (2013.01)

(58) Field of Classification Search

CPC .............. H01R 13/514; H01R 13/6591; H01R 13/6597; H01R 31/06; H01R 12/7082; H01R 12/71; H01R 12/712; H01R 13/405; H01R 13/426; H01R 13/648; H01R 13/658; H01R 13/6581; H01R 13/6585; H01R 31/005

See application file for complete search history.

(56) References Cited

U.S. PATENT DOCUMENTS

| | | | | |
|---|---|---|---|---|
| 9,716,326 | B2 | 7/2017 | Tamai | |
| 2010/0183141 | A1 | 7/2010 | Aral et al. | |
| 2010/0184307 | A1 | 7/2010 | Arai et al. | |
| 2015/0079814 | A1 | 3/2015 | Tamai | |
| 2015/0079819 | A1 | 3/2015 | Tamai | |
| 2016/0172803 | A1 | 6/2016 | Tamai | |
| 2016/0240976 | A1 | 8/2016 | Tamai | |
| 2017/0346247 | A1* | 11/2017 | Tamai ................ | H05K 13/0465 |
| 2017/0358885 | A1 | 12/2017 | Okuyama et al. | |
| 2018/0013240 | A1 | 1/2018 | Takeuchi | |
| 2019/0165509 | A1 | 5/2019 | Sano | |
| 2019/0165515 | A1* | 5/2019 | Sano .................. | H01R 13/6278 |

FOREIGN PATENT DOCUMENTS

| | | | |
|---|---|---|---|
| CN | 207217960 | U | 4/2018 |
| CN | 109935985 | A | 6/2019 |
| CN | 110854572 | A | 2/2020 |
| CN | 211428445 | U | 9/2020 |
| CN | 211428493 | U | 9/2020 |
| DE | 10 2012 102 682 | A1 | 5/2013 |
| TW | M480188 | U | 6/2014 |
| TW | M607363 | U | 2/2021 |
| WO | WO2017/075763 | A1 | 5/2017 |

* cited by examiner

ADAPTER CONNECTOR WITH IMPROVED SHIELDING EFFECT

CROSS-REFERENCE TO RELATED APPLICATIONS

This patent application is a continuation of U.S. patent application Ser. No. 17/201,671, filed on Mar. 15, 2021, which is pending and claims priority of a Chinese Patent Application No. 202010194118.8, filed on Mar. 18, 2020 and titled “ADAPTER CONNECTOR”, the entire content of which is incorporated herein by reference.

TECHNICAL FIELD

The present disclosure relates to an adapter connector which belongs to the technical field of electrical connectors.

BACKGROUND

An adapter connector usually includes an insulating body and a plurality of conductive terminals installed in the insulating body. The insulating body is provided with a first port at one end and used for mating with a first connector and a second port at the other end and used for mating with a second connector. How to improve signal transmission quality of the adapter connector is a technical problem to be solved by those skilled in the art.

SUMMARY

An object of the present disclosure is to provide an adapter connector with improved shielding effect.

In order to achieve the above object, the present disclosure adopts the following technical solution: an adapter connector, including: a terminal assembly including a first terminal clamping portion at a first end and a second terminal clamping portion at a second end opposite to the first end; a first adapter housing defining a first receiving space; and a second adapter housing defining a second receiving space; wherein the first adapter housing and the second adapter housing are assembled together with the terminal assembly received therein; wherein the terminal assembly includes a first terminal module; the first terminal module includes a first insulating block, a plurality of first adapter terminals secured to the first insulating block, a first metal shield provided on a first side of the first insulating block, a second metal shield provided on a second side of the first insulating block, and a first conductive plate; the plurality of first adapter terminals include a plurality of first elastic contact portions protruding beyond the first insulating block and located at the first end, and a plurality of second elastic contact portions protruding beyond the first insulating block and located at the second end; the first terminal clamping portion includes the plurality of first elastic contact portions, and the second terminal clamping portion includes the plurality of second elastic contact portions; wherein the plurality of first adapter terminals include a plurality of first ground terminals, the first metal shield is in contact with one side of the plurality of first grounding terminals, and the first conductive plate includes a plurality of first conductive ribs which extend through the second metal shield to be in contact with the other side of the plurality of first ground terminals.

In order to achieve the above object, the present disclosure adopts the following technical solution; an adapter connector, including: a terminal assembly including a first terminal clamping portion at a first end and a second terminal clamping portion at a second end opposite to the first end; a first adapter housing defining a first receiving space; and a second adapter housing defining a second receiving space; wherein the first adapter housing and the second adapter housing are assembled together with the terminal assembly received therein; wherein the terminal assembly includes a first terminal module and a second terminal module; wherein the first terminal module includes a first insulating block, a plurality of first adapter terminals secured to the first insulating block, a first metal shield provided on a first side of the first insulating block, a second metal shield provided on a second side of the first insulating block, and a first conductive plate; the plurality of first adapter terminals include a plurality of first elastic contact portions protruding beyond the first insulating block and located at the first end, and a plurality of second elastic contact portions protruding beyond the first insulating block and located at the second end; wherein the plurality of first adapter terminals include a plurality of first ground terminals, the first metal shield is in contact with one side of the plurality of first grounding terminals, and the first conductive plate is in contact with the other side of the plurality of first ground terminals; wherein the second terminal module includes a second insulating block, a plurality of second adapter terminals secured to the second insulating block, a third metal shield provided on a first side of the second insulating block, a fourth metal shield provided on a second side of the second insulating block, and a second conductive plate; the plurality of second adapter terminals include a plurality of third elastic contact portions protruding beyond the second insulating block and located at the first end, and a plurality of fourth elastic contact portions protruding beyond the second insulating block and located at the second end; wherein the plurality of second adapter terminals include a plurality of second ground terminals, the third metal shield is in contact with one side of the plurality of second grounding terminals, and the second conductive plate is in contact with the other side of the plurality of second ground terminals; and wherein the first terminal clamping portion is formed by the plurality of first elastic contact portions and the plurality of third elastic contact portions, and the second terminal clamping portion is formed by the plurality of second elastic contact portions and the plurality of fourth elastic contact portions.

Compared with the prior art, the first metal shield is in contact with one side of the plurality of first grounding terminals, and the first conductive plate is in contact with the other side of the plurality of first ground terminals, thereby improving the shielding effect of the first adapter terminals.

BRIEF DESCRIPTION OF DRAWINGS

FIG. 1l is an exploded perspective view of FIG. 10 from another angle;

DETAILED DESCRIPTION

Figure 1:
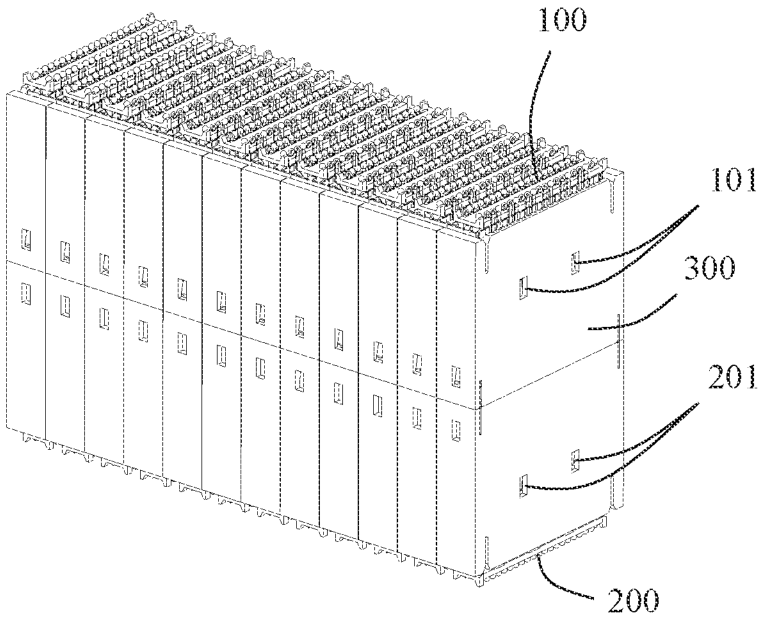
FIG. 1 is a perspective view of an electrical connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a". "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Figure 2:
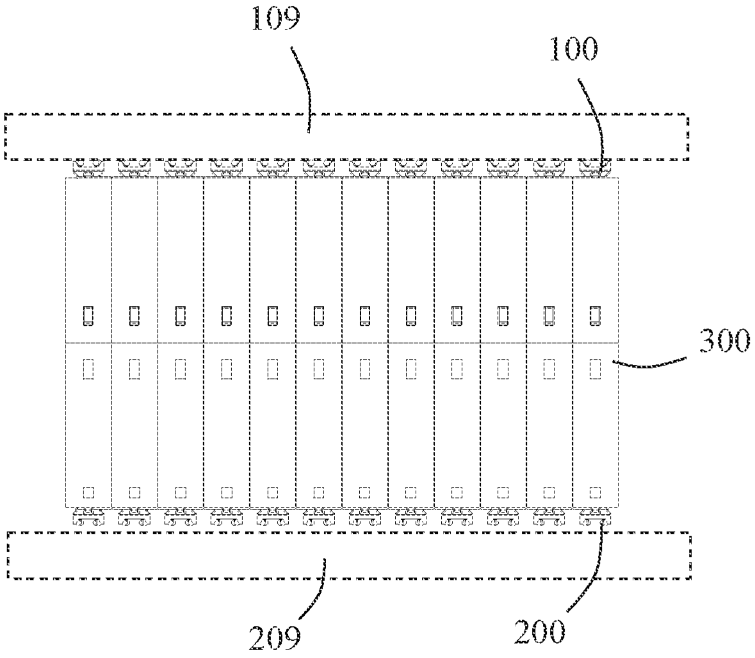
FIG. 2 is a front view of FIG. 1 and schematically shows how the electrical connector assembly is mounted to circuit boards.
Figure 3:
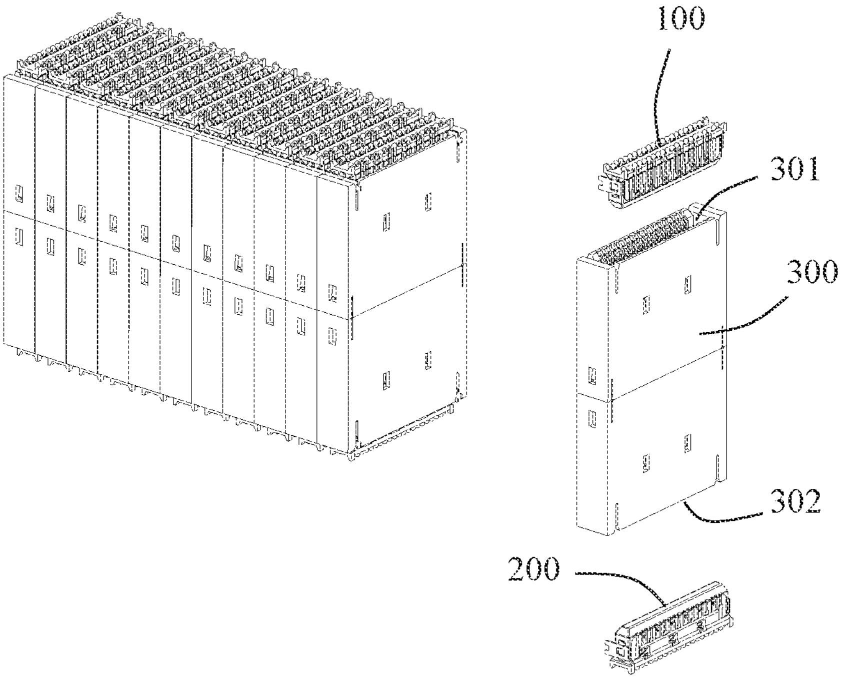
FIG. 3 is a partially exploded perspective view of FIG. 1.

Referring to FIGS. 1 to 3, the present disclosure discloses an electrical connector assembly including a first electrical connector 100, a second electrical connector 200, and an adapter connector 300 connecting the first electrical connector 100 and the second electrical connector 200. The adapter connector 300 includes a first connecting portion 301 and a second connecting portion 302 opposite to each other. The first connecting portion 301 is used for electrically connecting with the first electrical connector 100, and the second connecting portion 302 is used for electrically connecting with the second electrical connector 200. Referring to FIG. 2, the first electrical connector 100 is used for being mounted to a first circuit board 109, and the second electrical connector 200 is used for being mounted to a second circuit board 209. In an embodiment of the present disclosure, the first circuit board 109 is parallel to the second circuit board 209.

The adapter connector 300 includes a terminal assembly 3, a first adapter housing 1 and a second adapter housing 2. The first adapter housing 1 and the second adapter housing 2 are mated with the terminal assembly 3. The first adapter housing 1 and the second adapter housing 2 are assembled with each other. The terminal assembly 3 is received in the first adapter housing 1 and the second adapter housing 2. The terminal assembly 3 includes a first terminal clamping portion 31 at a first end (for example, an upper end in FIG. 4) and a second terminal clamping portion 32 at a second end (for example, a lower end in FIG. 4) opposite to the first end. The first terminal clamping portion 31 is used to realize electrical connection with the first terminals of the first electrical connector 100. The second terminal clamping portion 32 is used to realize electrical connection with the second terminals of the second electrical connector 200. The terminal assembly 3 is provided with a first locking assembly 101 (referring to FIG. 1) which is locked with the first adapter housing 1 and a second locking assembly 201 which is locked with the second adapter housing 2 (referring to FIG. 1).

Figure 6:
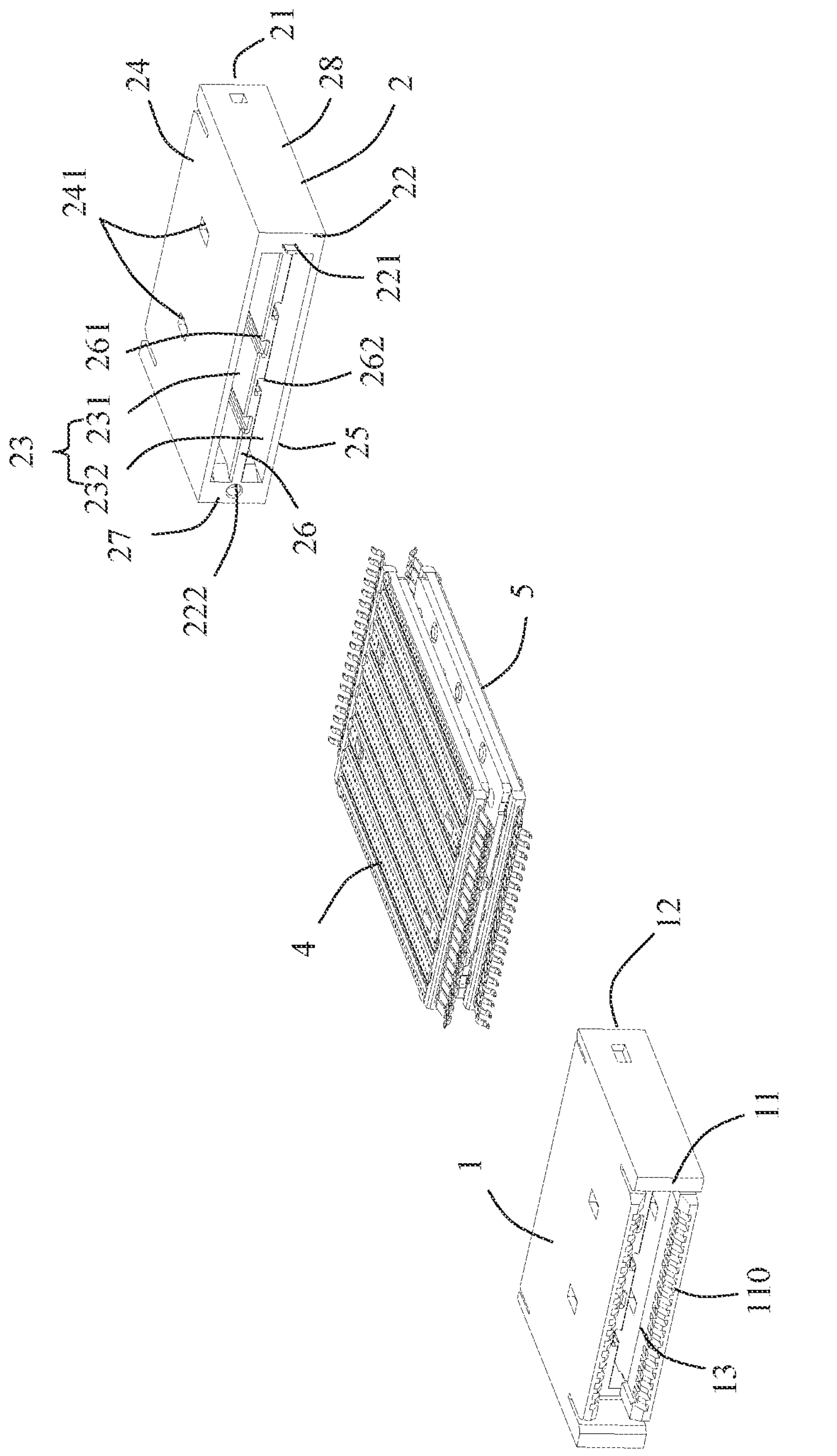
FIG. 6 is a partially exploded perspective view of the adapter connector of the present disclosure from another angle.
Figure 7:
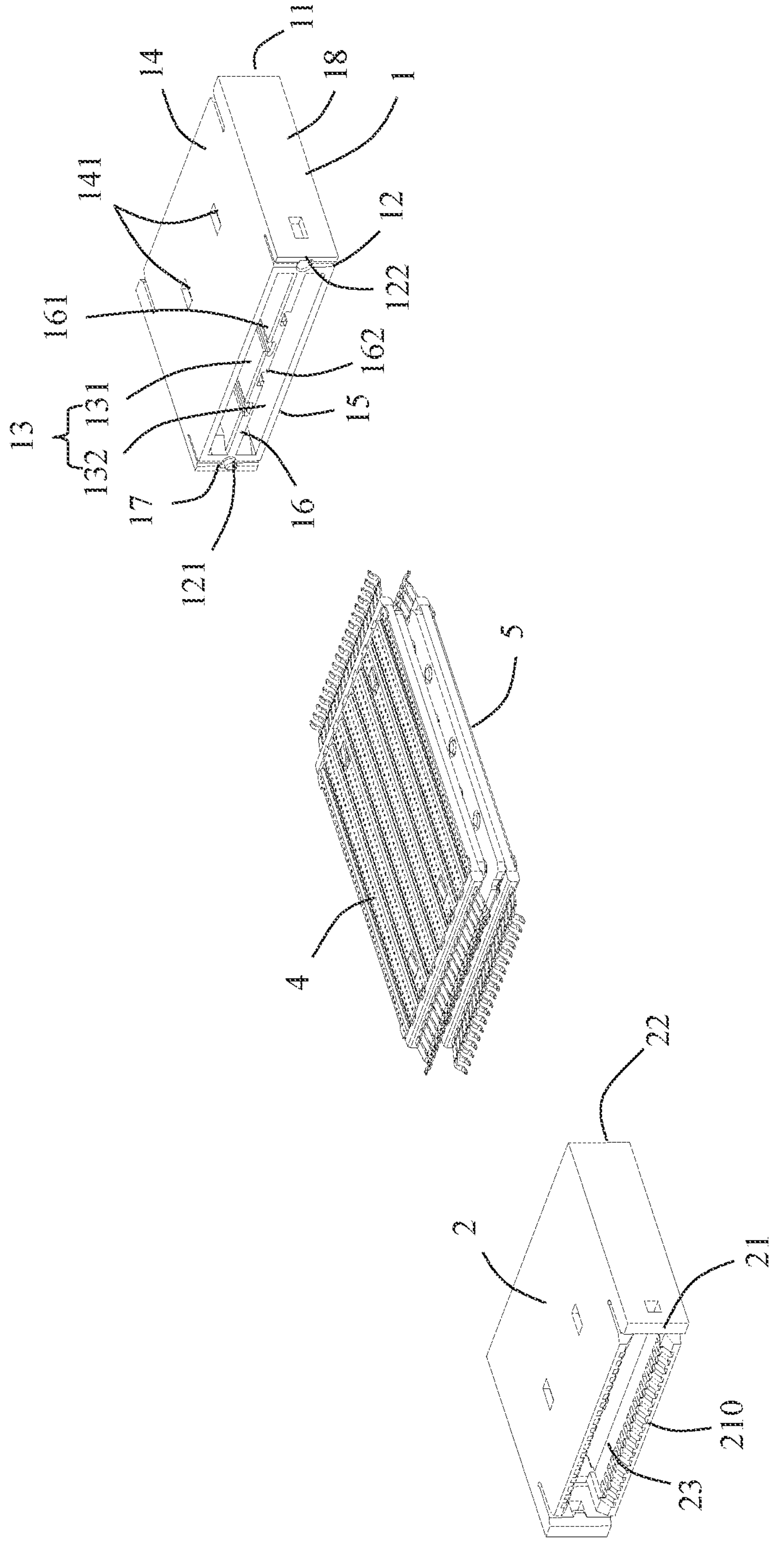
FIG. 7 is a partially exploded perspective view of FIG. 6 from another angle.
Figure 8:
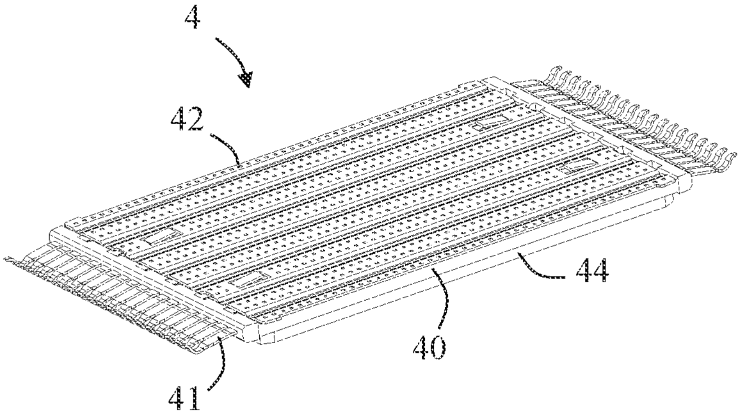
FIG. 8 is a perspective schematic view of a first terminal module.
Figure 9:
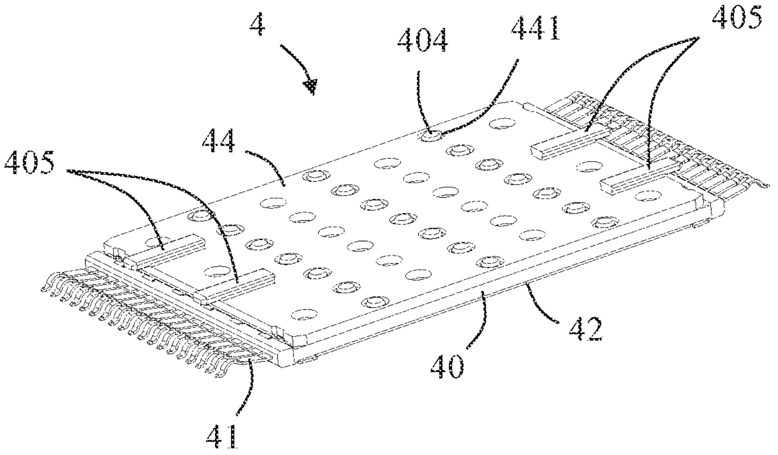
FIG. 9 is a perspective schematic view of FIG. 8 from another angle.

Referring to FIGS. 6 and 7, the first adapter housing 1 includes a first mating surface 11, a first mounting surface 12 opposite to the first mating surface 11, and a first receiving space 13 extending through the first mating surface 1l and the first mounting surface 12. The first receiving space 13 is used for receiving the first electrical connector 100. The first adapter housing 1 further includes a plurality of first receiving grooves 110 extending through the first mating surface 1l and used for receiving the first terminal clamping portion 31. More specifically, the first adapter housing 1 includes a first side wall 14, a second side wall 15 opposite to the first side wall 14, a first intermediate wall 16 located between the first side wall 14 and the second side wall 15, a third side wall 17 connecting one side of the first side wall 14 and the second side wall 15, and a fourth side wall 18 connecting the other side of the first side wall 14 and the second side wall 15. Opposite sides of the first intermediate wall 16 are connected with the third side wall 17 and the fourth side wall 18, respectively. The first receiving space 13 includes a first channel 131 located between the first side wall 14 and the first intermediate wall 16 and a second channel 132 located between the second side wall 15 and the first intermediate wall 16.

Figure 4:
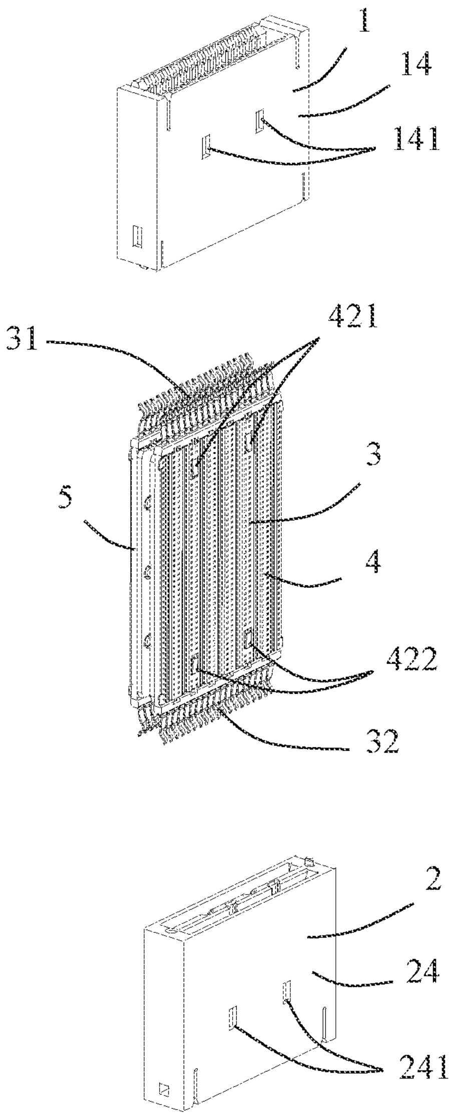
FIG. 4 is a partially exploded perspective view of an adapter connector shown in FIG. 3 of the present disclosure.

In the illustrated embodiment of the present disclosure, the first side wall 14 includes a first locking opening 141 communicating with the first channel 131 (referring to FIG. 4). The second side wall 15 includes a third locking opening 151 communicating with the second channel 132 (referring to FIG. 5). The first locking opening 141 and the third locking opening 151 are used for locking with the terminal assembly 3. In addition, opposite surfaces of the first intermediate wall 16 are respectively provided with a plurality of first dovetail grooves 161 and a plurality of second dovetail grooves 162 (referring to FIG. 7).

Referring to FIG. 7, the first adapter housing 1 further includes a first positioning protrusion 121 and a first positioning recess 122 on the first mounting surface 12. The first positioning protrusion 121 and the first positioning recess 122 are located on two sides, respectively. In an embodiment of the present disclosure, the first positioning protrusion 121 is close to the third side wall 17, and the first positioning recess 122 is close to the fourth side wall 18.

As shown in FIG. 6 and FIG. 7, the second adapter housing 2 includes a second mating surface 21, a second mounting surface 22 opposite to the second mating surface 21, and a second receiving space 23 extending through the second mating surface 21 and the second mounting surface 22. The second receiving space 23 is used for receiving the second electrical connector 200. The second adapter housing 2 further includes a plurality of second receiving grooves 210 extending through the second mating surface 21 and used for receiving the second terminal clamping portion 32. More specifically, the second adapter housing 2 includes a fifth side wall 24, a sixth side wall 25 opposite to the fifth side wall 24, a second intermediate wall 26 located between the fifth side wall 24 and the sixth side wall 25, a seventh side wall 27 connecting one side of the fifth side wall 24 and the sixth side wall 25, and an eighth side wall 28 connecting the other side of the fifth side wall 24 and the sixth side wall 25. Opposite sides of the second intermediate wall 26 are connected with the seventh side wall 27 and the eighth side wall 28, respectively. The second receiving space 23 includes a third channel 231 located between the fifth side wall 24 and the second intermediate wall 26, and a fourth channel 232 located between the sixth side wall 25 and the second intermediate wall 26.

In the illustrated embodiment of the present disclosure, the fifth side wall 24 includes a second locking opening 241 communicating with the third channel 231 (referring to FIG. 6). The sixth side wall 25 includes a fourth locking opening 251 communicating with the fourth channel 232 (referring to FIG. 5). The second locking opening 241 and the fourth locking opening 251 are used for locking with the terminal assembly 3. In addition, opposite surfaces of the second intermediate wall 26 are respectively provided with a plurality of third dovetail grooves 261 and a plurality of fourth dovetail grooves 262.

Referring to FIG. 6, the second adapter housing 2 is further provided with a second positioning protrusion 221 and a second positioning recess 222 on the second mounting surface 22. The second positioning protrusion 221 and the second positioning recess 222 are located on two sides, respectively. In an embodiment of the present disclosure, the second positioning protrusion 221 is close to the eighth side wall 28, and the second positioning recess 222 is close to the seventh side wall 27.

The first adapter housing 1 and the second adapter housing 2 are in contact with each other and have positioning structures which are mated with each other. In the illustrated embodiment of the present disclosure, the positioning structures include the first positioning protrusion 121 and the first positioning recess 122 provided on the first adapter housing 1, and the second positioning protrusion 221 and the second positioning recess 222 provided on the second adapter housing 2. The first positioning protrusion 121 of the first adapter housing 1 is mated with the second positioning recess 222 of the second adapter housing 2. The first positioning recess 122 of the first adapter housing 1 is mated with the second positioning protrusion 221 of the second adapter housing 2. After the assembly of the first adapter housing 1 and the second adapter housing 2 is completed, the first channel 131 and the third channel 231 are aligned with each other, and the second channel 132 and the fourth channel 232 are aligned with each other.

Preferably, the structure of the first adapter housing 1 and the structure of the second adapter housing 2 are the same, so that the first adapter housing 1 and the second adapter housing 2 can be shared. In an embodiment of the present disclosure, the first adapter housing 1 and the second adapter housing 2 are in a point-symmetric relationship. When the first adapter housing 1 and the second adapter housing 2 are shared, it means one of the first adapter housing 1 and the second adapter housing 2 can be assembled by rotating one of the first adapter housings 1 and the second adapter housing 2 by 180 degrees. As a result, only a set of molds are needed, which saves costs.

Figure 5:
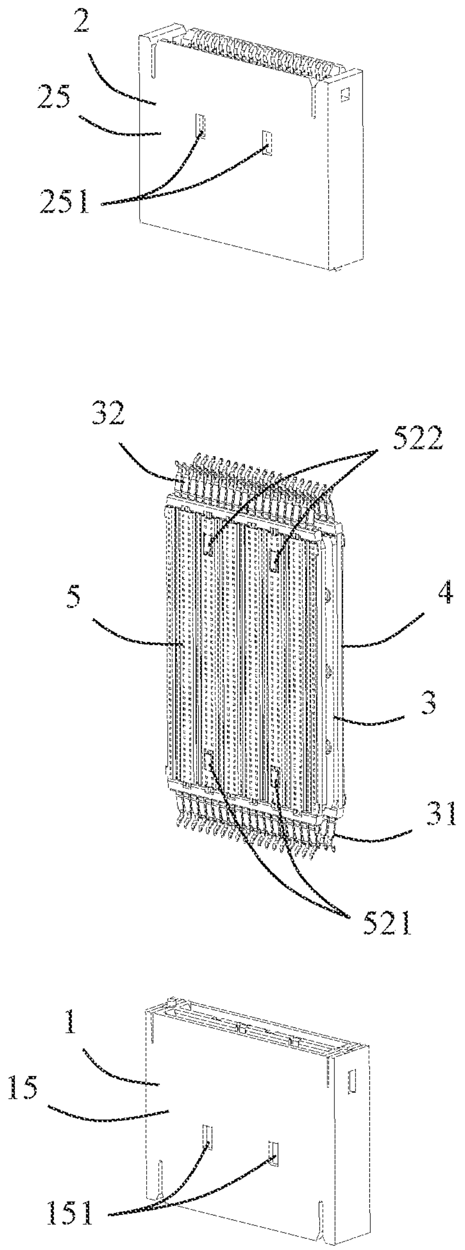
FIG. 5 is a partially exploded perspective view of FIG. 4 from another angle.

Referring to FIGS. 4 and 5, the terminal assembly 3 includes a first locking protrusion 421 mated with the first locking opening 141, a second locking protrusion 422 mated with the second locking opening 241, a third locking protrusion 521 mated with the third locking opening 151, and a fourth locking protrusion 522 mated with the fourth locking opening 251.

The first locking assembly 101 includes the first locking protrusion 421 provided on the terminal assembly 3 and mated with the first locking opening 141 of the first adapter housing 1. The first locking protrusion 421 is locked in the first locking opening 141. The second locking assembly 201 includes the second locking protrusion 422 provided on the terminal assembly 3 and mated with the second locking opening 241 of the second adapter housing 2. The second locking protrusion 422 is locked in the second locking opening 241. In this embodiment, the first locking assembly 101 further includes the third locking protrusion 521 provided on the terminal assembly 3 and mated with the third locking opening 151 of the first adapter housing 1. The third locking protrusion 521 is locked in the third locking opening 151. The second locking assembly 201 further includes the fourth locking protrusion 522 provided on the terminal assembly 3 and mated with the fourth locking opening 251 of the second adapter housing 2. The fourth locking protrusion 522 is locked in the fourth locking opening 251.

Referring to FIGS. 4 to 11, the terminal assembly 3 includes a first terminal module 4 received in the first channel 131 and the third channel 231. The first terminal module 4 includes a first insulating block 40, a plurality of first adapter terminals 41 fixed to the first insulating block 40, and a first metal shield 42 located on one side of the first insulating block 40. In an embodiment of the present disclosure, the first terminal module 4 further includes a first conductive plate 44 located on the other side of the first insulating block 40. The first conductive plate 44 and the first metal shield 42 are located on opposite sides of the plurality of first adapter terminals 41, respectively. In an embodiment of the present disclosure, the first terminal module 4 further includes a second metal shield 43 which contacts the first conductive plate 44. In some embodiment, the first conductive plate 44 is made by a conductive glue, a conductive adhesive, or a conductive plastic.

In an embodiment of the present disclosure, the plurality of first adapter terminals 41 are insert-molded with the first insulating block 40. The plurality of first adapter terminals 41 include a plurality of first elastic contact portions 411 protruding beyond the first insulating block 40 and located at the first end (for example, a left end in FIG. 10), and a plurality of second elastic contact portions 412 protruding beyond the first insulating block 40 and located at the second end (for example, a right end in FIG. 10). The plurality of first adapter terminals 41 include a plurality of first signal terminals S1 and a plurality of first ground terminals G1. Preferably, the first signal terminals S1 include a plurality of differential signal pairs, and the first ground terminals G1 are provided on both sides of each differential signal pair.

Figure 10:
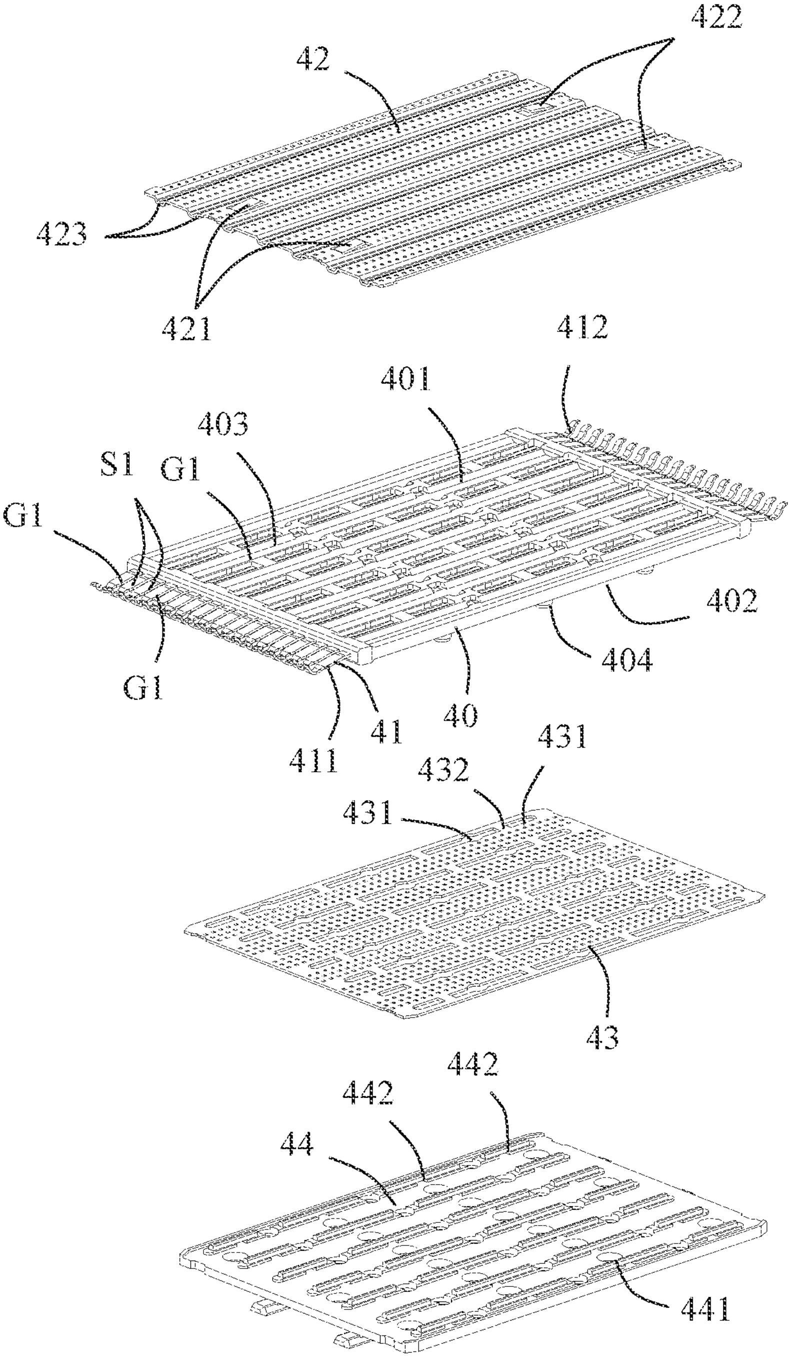
FIG. 10 is an exploded perspective view of FIG. 8.
Figure 11:
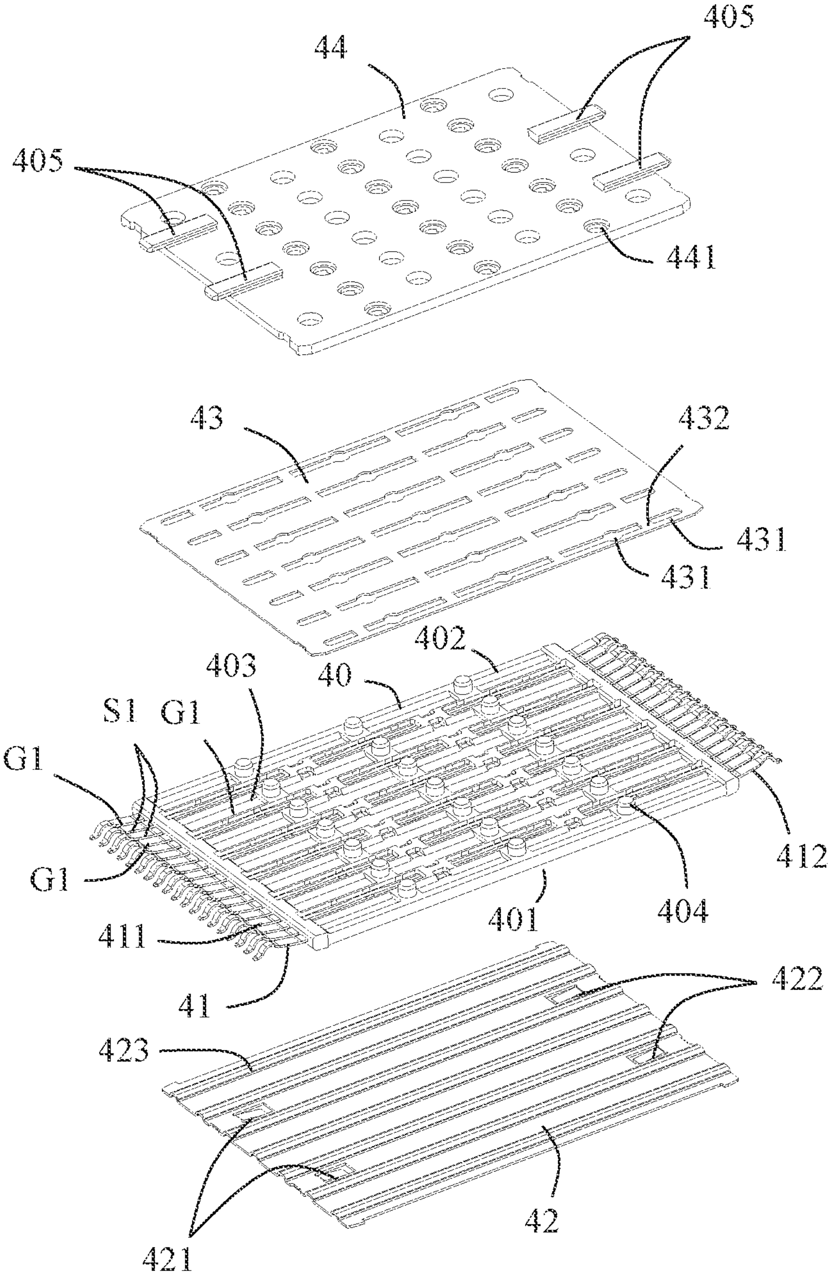
Figure 12:
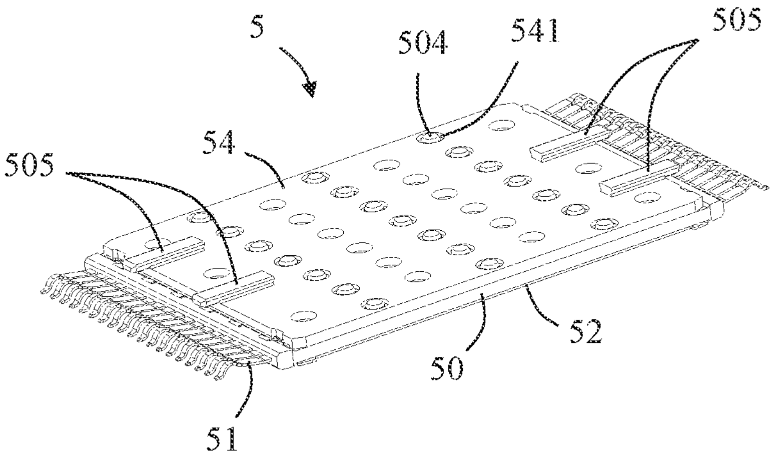
FIG. 12 is a perspective schematic view of a second terminal module.
Figure 13:
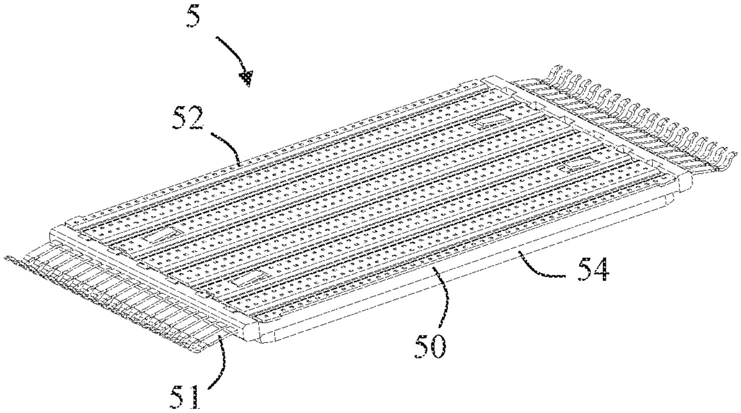
FIG. 13 is a perspective schematic view of FIG. 12 from another angle.

The first insulating block 40 includes a first surface 401 (for example, a top surface in FIG. 10) and a second surface 402 (for example, a bottom surface in FIG. 10) opposite to the first surface 401. The first surface 401 and the second surface 402 are located between the first end and the second end. The first metal shield 42 is provided on the first surface 401 of the first insulating block 40. The second metal shield 43 and the first conductive plate 44 are both provided on the second surface 402 of the first insulating block 40. Referring to FIG. 10, in the illustrated embodiment of the present disclosure, two opposite surfaces of the plurality of first ground terminals G1 are exposed in first slots 403 of the first insulating block 40. The first insulating block 40 is further provided with a plurality of first heat melt posts 404 located on the second surface 402. Referring to FIG. 11, the first insulating block 40 is further provided with a plurality of first ribs 405 which are mated with the first dovetail grooves 161 and the third dovetail grooves 261.

The first metal shield 42 is provided with a plurality of protruding ribs 423 protruding toward the first ground terminals G1. The protruding ribs 423 extend through the first slots 403 so as to be in contact with one side of the corresponding first ground terminals G1. Preferably, the plurality of protruding ribs 423 are fixed to the plurality of first ground terminals G1 by soldering or welding (for example, laser welding). In the illustrated embodiment of the present disclosure, the first locking protrusion 421 and the second locking protrusion 422 are provided on the first metal shield 42. For example, the first locking protrusion 421 and the second locking protrusion 422 are formed by stamping the first metal shield 42.

The second metal shield 43 is located between the second surface 402 of the first insulating block 40 and the first conductive plate 44 so as to improve the shielding effect. The second metal shield 43 is provided with a plurality of slots 431 corresponding to the first ground terminals G1 and a plurality of connecting portions 432 of which each is located between two adjacent slots 431.

The first conductive plate 44 includes a plurality of first openings 441 corresponding to the first heat melt posts 404 and a plurality of first conductive ribs 442 protruding toward the first ground terminals G1. The second metal shield 43 and the first conductive plate 44 are fixed together by insert molding or heat melting. In an embodiment of the present disclosure, the first insulating block 40, the second metal shield 43, and the first conductive plate 44 are fixed together by heat melting. During assembling, the first heat melt posts 404 may extend through the corresponding first openings 441 before being heat-melted. After heat melting, the first heat melting posts 404 and the first openings 441 are integrated. During heat melting, the connecting portions 432 extend through the corresponding first conductive ribs 442 to be embedded in the first conductive plate 44. When the connecting portions 432 extend through the corresponding first conductive ribs 442, the first conductive ribs 442 extend through the corresponding slots 431 on both sides of the corresponding connecting portions 432. After heat melting, the connecting portions 432 will be embedded in the first conductive plate 44 and the first conductive plate 44 will contact the other side of the first ground terminals G1. In this way, the first ground terminals G1 are in contact with the first metal shield 42 and the first conductive plate 44, and the first conductive plate 44 is electrically connected to the second metal shield 43, thereby increasing the grounding area and improving the shielding effect. In some embodiment, the first conductive rib 442 is made by a conductive glue, a conductive adhesive, or a conductive plastic.

Referring to FIGS. 4 to 7 and FIGS. 12 to 15, in this embodiment, the terminal assembly 3 further includes a second terminal module 5. In this embodiment, the second terminal module 5 and the first terminal module 4 are disposed symmetrically. Components of the second terminal module 5 and connection relationships of the components are the same as those of the first terminal module 4, which is not limited to this. The second terminal module 5 is received in the second channel 132 and the fourth channel 232. Referring to FIGS. 12 to 15, the second terminal module 5 includes a second insulating block 50, a plurality of second adapter terminals 51 fixed to the second insulating block 50, a third metal shield 52 located on one side of the second insulating block 50, a fourth metal shield 53 located on the other side of the second insulating block 50, and a second conductive plate 54. In some embodiment, the second conductive plate 54 is made by a conductive glue, a conductive adhesive, or a conductive plastic.

In an embodiment of the present disclosure, the plurality of second adapter terminals 51 are insert-molded in the second insulating block 50. The plurality of second adapter terminals 51 include a plurality of third elastic contact portions 511 protruding beyond the second insulating block 50 and located at the first end (for example, a left end in FIG. 15), and a plurality of fourth elastic contact portions 512 protruding beyond the second insulating block 50 and located at the second end (for example, a right end in FIG. 15). The plurality of second adapter terminals 51 include a plurality of second signal terminals S2 and a plurality of second ground terminals G2. Preferably, the second signal terminals S2 includes a plurality of differential signal pairs, and the second ground terminals G2 are provided on both sides of each differential signal pair.

Figure 14:
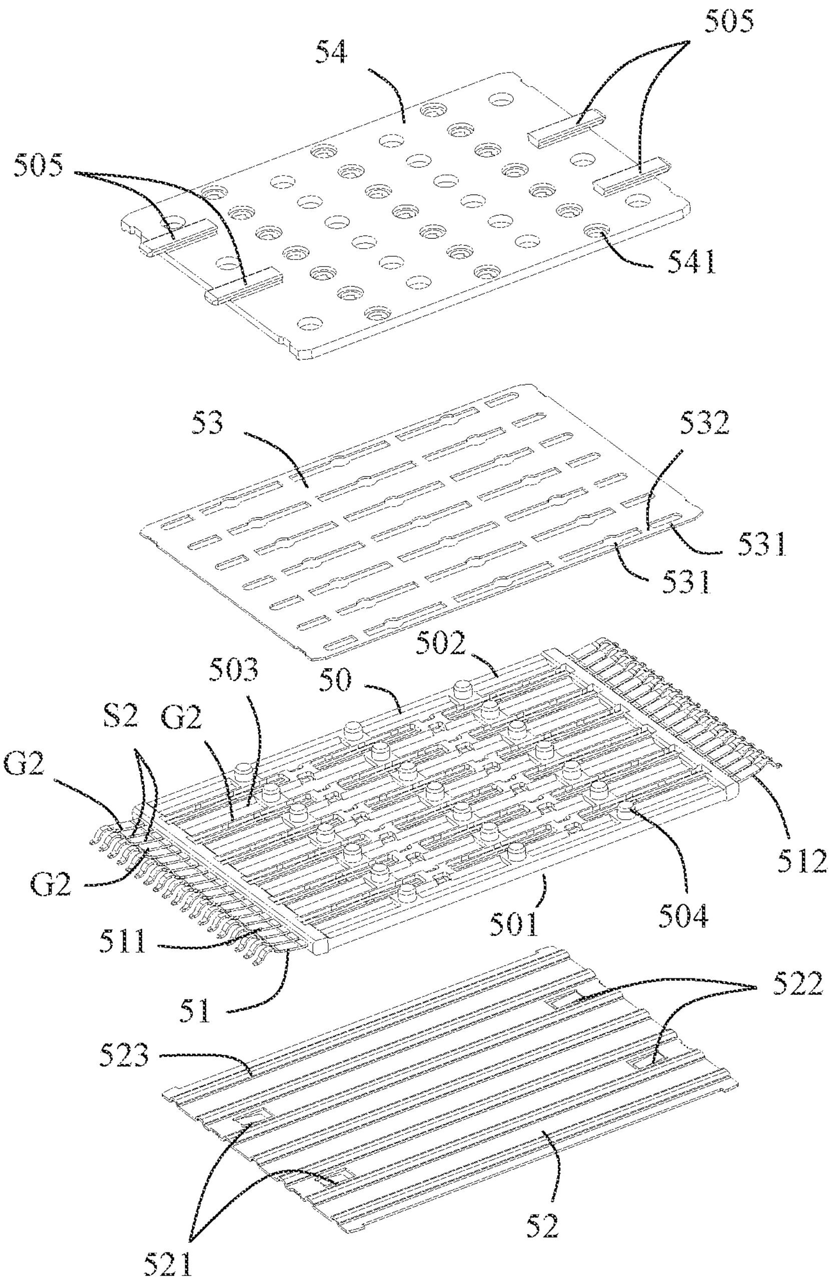
FIG. 14 is an exploded perspective view of FIG. 12.
Figure 15:
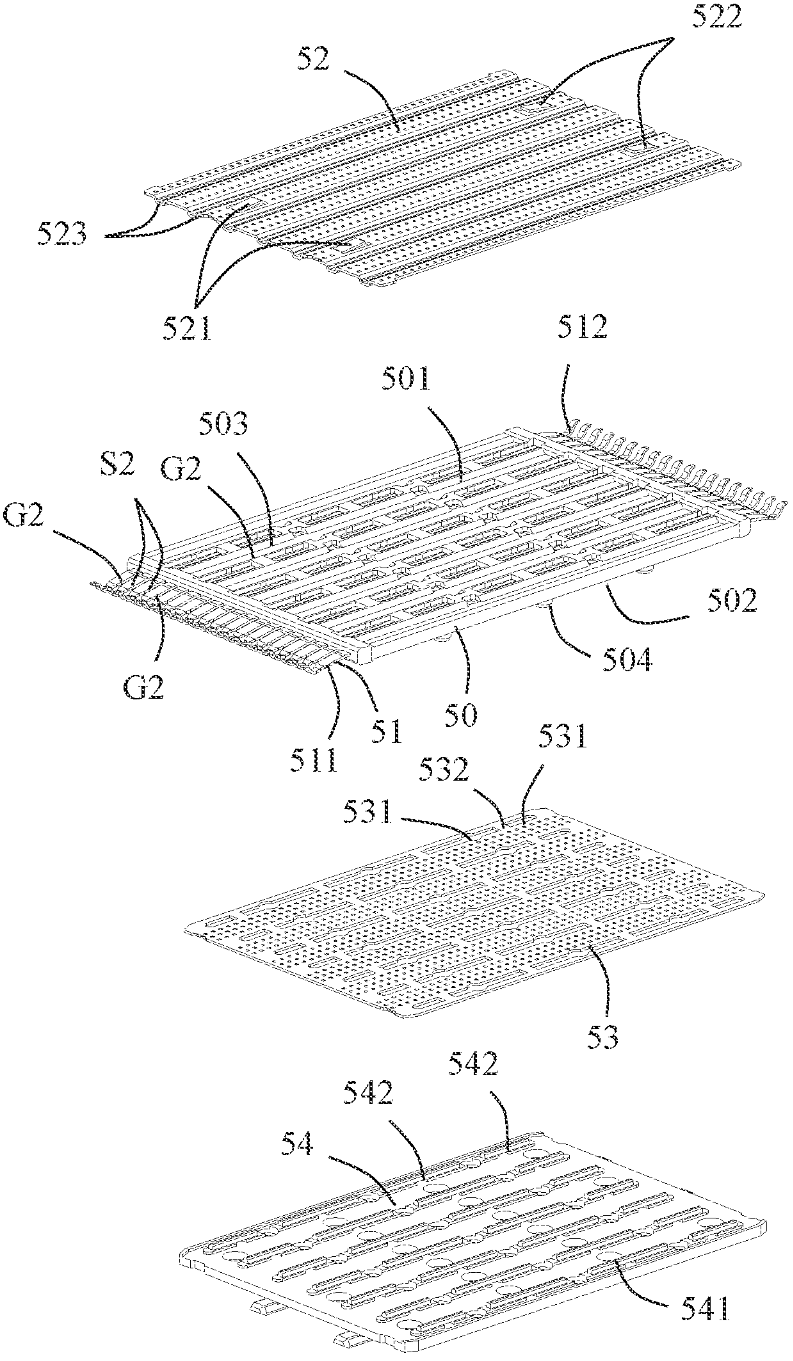
FIG. 15 is an exploded perspective view of FIG. 14 from another angle.

The second insulating block 50 includes a third surface 501 (for example, a top surface in FIG. 15) and a fourth surface 502 (for example, a bottom surface in FIG. 15) opposite to the third surface 501. The third surface 501 and the fourth surface 502 are located between the first end and the second end. The third metal shield 52 is provided on the third surface 501 of the second insulating block 50. The fourth metal shield 53 and the second conductive plate 54 are both provided on the fourth surface 502 of the second insulating block 50. Referring to FIG. 15, in the illustrated embodiment of the present disclosure, opposite surfaces of the plurality of second ground terminals G2 are exposed in second slots 503 of the second insulating block 50. The second insulating block 50 is also provided with a plurality of second heat melt posts 504 located on the fourth surface 502. Referring to FIG. 14, the second insulating block 50 is further provided with a plurality of second ribs 505 mated with the second dovetail grooves 162 and the fourth dovetail grooves 262.

Figure 16:
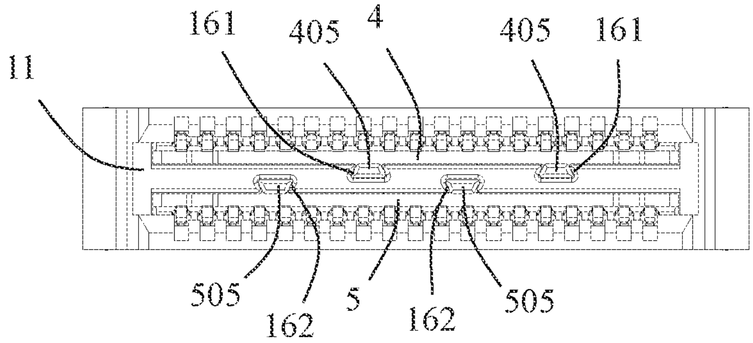
FIG. 16 is a top view of the adapter connector in FIG. 3.
Figure 17:
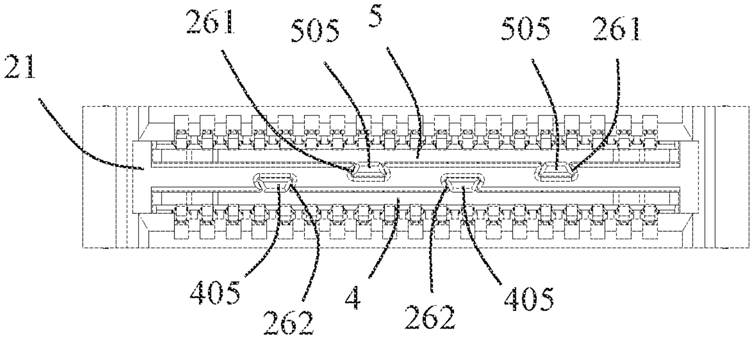
FIG. 17 is a bottom view of the adapter connector in FIG. 3.

Referring to FIGS. 6, 7, 11 and 14, when the first adapter housing 1, the second adapter housing 2 and the terminal assembly 3 are assembled together, the first ribs 405 and the second ribs 505 of the terminal assembly 3 can be respectively aligned and inserted into the first dovetail grooves 161, the third dovetail grooves 261, the second dovetail grooves 162 and the fourth dovetail grooves 262 of the first adapter housing 1 and the second adapter housing 2 (as shown in FIGS. 16 and 17). As a result, the first adapter housing 1 and the second adapter housing 2 can respectively enclose the terminal assembly 3 from opposite ends of the terminal assembly 3 and abut with each other in the middle of the terminal assembly 3, which is beneficial to the overall assembly and positioning of the adapter connector 300.

The third metal shield 52 includes a plurality of protruding ribs 523 protruding toward the second ground terminals G2. The protruding ribs 523 extend through the second slots 503 so as to be in contact with one side of the corresponding second ground terminals G2. Preferably, the plurality of protruding ribs 523 are fixed to the plurality of second ground terminals G2 by soldering or welding (for example, laser welding). In the illustrated embodiment of the present disclosure, the third locking protrusion 521 and the fourth locking protrusion 522 are disposed on the third metal shield 52. For example, the third locking protrusion 521 and the fourth locking protrusion 522 are formed by stamping the third metal shield 52.

The fourth metal shield 53 is located between the fourth surface 502 of the second insulating block 50 and the second conductive plate 54 in order to improve the shielding effect. The fourth metal shield 53 is provided with a plurality of slots 531 corresponding to the second ground terminals G2 and a plurality of connecting portions 532 of which each is located between two adjacent slots 531.

The second conductive plate 54 includes a plurality of second openings 541 corresponding to the second heat melt posts 504 and a plurality of second conductive ribs 542 protruding toward the second ground terminals G2. The fourth metal shield 53 and the second conductive plate 54 are fixed together by insert molding or heat melting. In an embodiment of the present disclosure, the second insulating block 50, the fourth metal shield 53 and the second conductive plate 54 are fixed together by heat melting. After heat melting, the second heat melt posts 504 and the second openings 541 are integrated, and the connecting portions 532 extend through the corresponding second conductive ribs 542 so as to be embedded in the second conductive plate 54. The second conductive ribs 542 extend through the corresponding slots 531 to contact the other side of the plurality of second ground terminals G2. With this arrangement, the second ground terminals G2 are in contact with both the third metal shield 52 and the second conductive plate 54, thereby increasing the grounding area and improving the shielding effect. In some embodiment, the second conductive rib 542 is made by a conductive glue, a conductive adhesive, or a conductive plastic.

In the illustrated embodiment of the present disclosure, the first terminal clamping portion 31 includes the plurality of first elastic contact portions 411 and the plurality of third elastic contact portions 511. The second terminal clamping portion 32 includes the plurality of second elastic contact portions 412 and the plurality of fourth elastic contact portions 512.

Compared with the prior art, by providing the first adapter housing 1 and the second adapter housing 2 which are assembled with each other, the present disclosure reduces the difficulty of manufacturing the housing. In addition, by providing the terminal assembly 3 with the first locking assembly 101 which is locked with the first adapter housing 1 and a second locking assembly 201 which is locked with the second adapter housing 2, it facilitates the assembly of the adapter connector 300 of the present disclosure.

Preferably, the first locking opening 141, the second locking opening 241, the third locking opening 151, and the fourth locking opening 251 all extend outwardly through the corresponding side walls. With this arrangement, when the terminal assembly 3 needs to be disassembled, a tool can be inserted into the corresponding locking openings to push against the corresponding locking protrusions, so that the locking protrusions can be separated from the locking openings, thereby facilitating disassembly of the adapter connector 300.

The above embodiments are only used to illustrate the present disclosure and not to limit the technical solutions described in the present disclosure. The understanding of this specification should be based on those skilled in the art. Descriptions of directions, such as "left", "right", "front" and "back", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An adapter connector, comprising:

a terminal assembly comprising a first terminal clamping portion at a first end and a second terminal clamping portion at a second end opposite to the first end;

a first adapter housing defining a first receiving space; and a second adapter housing defining a second receiving space;

wherein the first adapter housing and the second adapter housing are assembled together with the terminal assembly received therein;

wherein the terminal assembly comprises a first terminal module; the first terminal module comprises a first insulating block, a plurality of first adapter terminals secured to the first insulating block, a first metal shield provided on a first side of the first insulating block, a second metal shield provided on a second side of the first insulating block, and a first conductive plate; the plurality of first adapter terminals comprise a plurality of first elastic contact portions protruding beyond the first insulating block and located at the first end, and a plurality of second elastic contact portions protruding beyond the first insulating block and located at the second end; the first terminal clamping portion comprises the plurality of first elastic contact portions, and the second terminal clamping portion comprises the plurality of second elastic contact portions;

wherein the plurality of first adapter terminals comprise a plurality of first ground terminals, the first metal shield is in contact with one side of the plurality of first grounding terminals, and the first conductive plate comprises a plurality of first conductive ribs which extend through the second metal shield to be in contact with the other side of the plurality of first ground terminals.

2. The adapter connector according to claim 1, wherein the second metal shield and the first conductive plate are located on a same side of the plurality of first adapter terminals; the second metal shield defines a plurality of slots corresponding to the first ground terminals; and the plurality of first conductive ribs extend through the plurality of slots so as to be in contact with the other side of the plurality of first ground terminals.

3. The adapter connector according to claim 1, wherein the first adapter housing defines a first locking opening, the second adapter housing defines a second locking opening, the first metal shield is stamped to form a first locking protrusion and a second locking protrusion, and the first locking protrusion and the second locking protrusion are locked in the first locking opening and the second locking opening, respectively.

4. The adapter connector according to claim 1, wherein the first adapter housing and the second adapter housing are in contact with each other and have positioning structures which are mated with each other.

5. The adapter connector according to claim 4, wherein the first adapter housing comprises a first positioning protrusion and a first positioning recess on opposite sides thereof, and the second adapter housing comprises a second positioning protrusion and a second positioning recess on opposite sides thereof; and wherein the first positioning protrusion of the first adapter housing is mated with the second positioning recess of the second adapter housing, and the first positioning recess on the first adapter housing is mated with the second positioning protrusion of the second adapter housing.

6. The adapter connector according to claim 1, wherein the second metal shield and the first conductive plate are fixed together by insert molding or heat melting.

7. The adapter connector according to claim 1, wherein the first metal shield comprises a plurality of protruding ribs which are fixed to the plurality of first ground terminals by soldering or welding.

8. The adapter connector according to claim 7, wherein the first insulating block, the second metal shield and the first conductive plate are fixed together by heat melting.

9. The adapter connector according to claim 1, wherein the plurality of first adapter terminals are insert-molded with the first insulating block.

10. An adapter connector, comprising:

a terminal assembly comprising a first terminal clamping portion at a first end and a second terminal clamping portion at a second end opposite to the first end;

a first adapter housing defining a first receiving space; and a second adapter housing defining a second receiving space;

wherein the first adapter housing and the second adapter housing are assembled together with the terminal assembly received therein;

wherein the terminal assembly comprises a first terminal module and a second terminal module;

wherein the first terminal module comprises a first insulating block, a plurality of first adapter terminals secured to the first insulating block, a first metal shield provided on a first side of the first insulating block, a second metal shield provided on a second side of the first insulating block, and a first conductive plate; the plurality of first adapter terminals comprise a plurality of first elastic contact portions protruding beyond the first insulating block and located at the first end, and a plurality of second elastic contact portions protruding beyond the first insulating block and located at the second end;

wherein the plurality of first adapter terminals comprise a plurality of first ground terminals, the first metal shield is in contact with one side of the plurality of first grounding terminals, and the first conductive plate is in contact with the other side of the plurality of first ground terminals;

wherein the second terminal module comprises a second insulating block, a plurality of second adapter terminals secured to the second insulating block, a third metal shield provided on a first side of the second insulating block, a fourth metal shield provided on a second side of the second insulating block, and a second conductive plate; the plurality of second adapter terminals comprise a plurality of third elastic contact portions protruding beyond the second insulating block and located at the first end, and a plurality of fourth elastic contact portions protruding beyond the second insulating block and located at the second end;

wherein the plurality of second adapter terminals comprise a plurality of second ground terminals, the third metal shield is in contact with one side of the plurality of second grounding terminals, and the second conductive plate is in contact with the other side of the plurality of second ground terminals;

wherein the first terminal clamping portion is formed by the plurality of first elastic contact portions and the plurality of third elastic contact portions, and the second terminal clamping portion is formed by the plurality of second elastic contact portions and the plurality of fourth elastic contact portions; and wherein the second metal shield and the first conductive plate are located on a same side of the plurality of first adapter terminals; the second metal shield defines a plurality of first slots corresponding to the first ground terminals; and the first conductive plate comprises a plurality of first conductive ribs which extend through the plurality of first slots to be in contact with the other side of the plurality of first ground terminals.

11. The adapter connector according to claim 10, wherein the fourth metal shield and the second conductive plate are located on a same side of the plurality of second adapter terminals; the fourth metal shield defines a plurality of second slots corresponding to the second ground terminals; and the second conductive plate comprises a plurality of second conductive ribs which extend through the plurality of second slots to be in contact with the other side of the plurality of second ground terminals.

12. The adapter connector according to claim 10, wherein the first adapter housing defines a first locking opening and a third locking opening, the second adapter housing defines a second locking opening and a fourth locking opening, the first metal shield is stamped to form a first locking protrusion and a second locking protrusion, the first locking protrusion and the second locking protrusion are locked in the first locking opening and the second locking opening, respectively;

the second metal shield is stamped to form a third locking protrusion and a fourth locking protrusion, the third locking protrusion and the fourth locking protrusion are locked in the third locking opening and the fourth locking opening, respectively;

the first locking opening and the third locking opening are located on a same side; and the third locking opening and the fourth locking opening are located on another same side.

13. The adapter connector according to claim 10, wherein the first adapter housing and the second adapter housing are in contact with each other and have positioning structures which are mated with each other.

14. The adapter connector according to claim 13, wherein the first adapter housing comprises a first positioning protrusion and a first positioning recess on opposite sides thereof, and the second adapter housing comprises a second positioning protrusion and a second positioning recess on opposite sides thereof; and wherein the first positioning protrusion of the first adapter housing is mated with the second positioning recess of the second adapter housing, and the first positioning recess on the first adapter housing is mated with the second positioning protrusion of the second adapter housing.

15. The adapter connector according to claim 10, wherein the second metal shield and the first conductive plate are fixed together by insert molding or heat melting; and/or wherein the fourth metal shield and the second conductive plate are fixed together by insert molding or heat melting.

16. The adapter connector according to claim 10, wherein the first metal shield comprises a plurality of first protruding ribs which are fixed to the plurality of first ground terminals by soldering or welding; and/or the third metal shield comprises a plurality of second protruding ribs which are fixed to the plurality of second ground terminals by soldering or welding.

17. The adapter connector according to claim 10, wherein the plurality of first adapter terminals are insert-molded with the first insulating block; and/or the plurality of second adapter terminals are insert-molded with the second insulating block.

18. The adapter connector according to claim 10, wherein the first adapter housing comprises a plurality of first receiving grooves to receive the first terminal clamping portion; and wherein the second adapter housing comprises a plurality of second receiving grooves to receive the second terminal clamping portion.

19. An adapter connector, comprising:

a terminal assembly comprising a first terminal clamping portion at a first end and a second terminal clamping portion at a second end opposite to the first end;

a first adapter housing defining a first receiving space; and a second adapter housing defining a second receiving space;

wherein the first adapter housing and the second adapter housing are assembled together with the terminal assembly received therein;

wherein the terminal assembly comprises a first terminal module and a second terminal module;

wherein the first terminal module comprises a first insulating block, a plurality of first adapter terminals secured to the first insulating block, a first metal shield provided on a first side of the first insulating block, a second metal shield provided on a second side of the first insulating block, and a first conductive plate; the plurality of first adapter terminals comprise a plurality of first elastic contact portions protruding beyond the first insulating block and located at the first end, and a plurality of second elastic contact portions protruding beyond the first insulating block and located at the second end;

wherein the plurality of first adapter terminals comprise a plurality of first ground terminals, the first metal shield is in contact with one side of the plurality of first grounding terminals, and the first conductive plate is in contact with the other side of the plurality of first ground terminals;

wherein the second terminal module comprises a second insulating block, a plurality of second adapter terminals secured to the second insulating block, a third metal shield provided on a first side of the second insulating block, a fourth metal shield provided on a second side of the second insulating block, and a second conductive plate; the plurality of second adapter terminals comprise a plurality of third elastic contact portions protruding beyond the second insulating block and located at the first end, and a plurality of fourth elastic contact portions protruding beyond the second insulating block and located at the second end;

wherein the plurality of second adapter terminals comprise a plurality of second ground terminals, the third metal shield is in contact with one side of the plurality of second grounding terminals, and the second conductive plate is in contact with the other side of the plurality of second ground terminals;

wherein the first terminal clamping portion is formed by the plurality of first elastic contact portions and the plurality of third elastic contact portions, and the second terminal clamping portion is formed by the plurality of second elastic contact portions and the plurality of fourth elastic contact portions; and wherein the first insulating block, the second metal shield and the first conductive plate are fixed together by heat melting; and/or the second insulating block, the fourth metal shield and the second conductive plate are fixed together by heat melting.

* * * * *